United States Patent
Dantressangle et al.

(10) Patent No.: US 8,671,111 B2
(45) Date of Patent: Mar. 11, 2014

(54) DETERMINATION OF RULES BY PROVIDING DATA RECORDS IN COLUMNAR DATA STRUCTURES

(75) Inventors: Patrick Dantressangle, Hampshire (GB); Eberhard Hechler, Sindelfingen (DE); Martin Oberhofer, Bondorf (DE); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/465,210

(22) Filed: May 7, 2012

(65) Prior Publication Data

US 2012/0310874 A1 Dec. 6, 2012

(30) Foreign Application Priority Data

May 31, 2011 (EP) .................................... 11168163

(51) Int. Cl.
*G06F 17/30* (2006.01)

(52) U.S. Cl.
USPC ........... 707/776; 707/803; 707/804; 707/806; 707/802

(58) Field of Classification Search
USPC .......... 707/776, 802–804, 806; 709/201, 203, 709/213, 217
See application file for complete search history.

(56) References Cited

U.S. PATENT DOCUMENTS

| | | | | |
|---|---|---|---|---|
| 6,141,441 A * | 10/2000 | Cass et al. | ...................... | 382/166 |
| 6,173,288 B1 * | 1/2001 | Diedrich et al. | ...................... | 1/1 |
| 7,136,867 B1 * | 11/2006 | Chatterjee et al. | ............ | 713/171 |
| 7,328,212 B2 * | 2/2008 | Voss et al. | .............................. | 1/1 |
| 7,412,131 B2 * | 8/2008 | Lee et al. | .......................... | 385/31 |
| 7,698,324 B2 * | 4/2010 | Vries | .............................. | 707/698 |
| 7,903,819 B2 * | 3/2011 | Gupta | .............................. | 380/277 |
| 7,917,494 B2 * | 3/2011 | Muller | .......................... | 707/711 |
| 8,078,645 B2 * | 12/2011 | Singh | .............................. | 707/802 |
| 8,090,696 B2 * | 1/2012 | Gouttas et al. | ................ | 707/694 |
| 2002/0038307 A1 * | 3/2002 | Obradovic et al. | ............ | 707/102 |
| 2002/0128998 A1 * | 9/2002 | Kil et al. | ............................ | 707/1 |

(Continued)

FOREIGN PATENT DOCUMENTS

CN    101727465 A    6/2010

OTHER PUBLICATIONS

L. Breiman, "Bagging Predictors," Machine Learning, 24, pp. 123-140 (1996).

(Continued)

*Primary Examiner* — Frantz Coby
(74) *Attorney, Agent, or Firm* — Cantor Colburn LLP (57) ABSTRACT

A method includes providing a columnar database comprising a plurality of columnar data structures associated with one column attribute; providing first data records having a plurality of first attribute-value pairs comprising counting information indicative of a number of first data records having the respective first attribute-value pair; providing mask data structures comprising one or more second attribute-value pairs; selecting second data records by intersecting the columnar data structures and the mask data structures; selecting one of the column attributes and one value contained in the column data structure associated with said selected column attribute as the destination attribute-value pair; creating one second rule for each first attribute-value pair; calculating, for each second rule, a co-occurrence-count between its respective source attribute-value pair and its destination attribute-value pair; and specifically selecting one or more of said second rules as the first rules in dependence on the calculated co-occurrence-count.

20 Claims, 5 Drawing Sheets

(56) References Cited

U.S. PATENT DOCUMENTS

| | | | |
|---|---|---|---|
| 2002/0129017 A1* | 9/2002 | Kil et al. | 707/6 |
| 2003/0078923 A1* | 4/2003 | Voss et al. | 707/7 |
| 2003/0145014 A1* | 7/2003 | Minch | 707/100 |
| 2004/0158552 A1* | 8/2004 | Lee et al. | 707/2 |
| 2004/0215726 A1* | 10/2004 | Arning et al. | 709/206 |
| 2004/0230417 A1* | 11/2004 | Kraiss et al. | 704/8 |
| 2005/0028046 A1* | 2/2005 | McArdle | 714/48 |
| 2005/0278286 A1 | 12/2005 | Djugash et al. | |
| 2006/0047780 A1* | 3/2006 | Patnude | 709/219 |
| 2007/0162470 A1* | 7/2007 | Chang et al. | 707/100 |
| 2007/0203939 A1* | 8/2007 | McArdle | 707/102 |
| 2008/0091691 A1* | 4/2008 | Tsuji | 707/100 |
| 2008/0140602 A1* | 6/2008 | Roth et al. | 706/59 |
| 2009/0177682 A1* | 7/2009 | Barbee et al. | 707/102 |
| 2009/0292592 A1* | 11/2009 | Shapira et al. | 705/10 |
| 2009/0292698 A1* | 11/2009 | Remy et al. | 707/5 |
| 2010/0005383 A1* | 1/2010 | Fish | 715/220 |
| 2010/0010967 A1* | 1/2010 | Muller | 707/3 |
| 2010/0174675 A1* | 7/2010 | Mons et al. | 707/603 |
| 2010/0235335 A1 | 9/2010 | Heman et al. | |
| 2011/0276367 A1* | 11/2011 | Shapira et al. | 705/7.29 |

OTHER PUBLICATIONS

M. J. Zaki, et al., "New Algorithms for Fast Discovery of Association Rules," KDD-97 Proceedings, (1997), AAAI (www.aaai.org); pp. 283-286.

International Search Report for PCT/IB2012/052639, mailed Oct. 18, 2012, 3 pages.

Written Opinion for PCT/IB2012/052639, mailed Oct. 18, 2012, 5 pages.

* cited by examiner

| Record | Machine ID | Operator | Temperature/°C | Moisture/% | Failure Rate/% | Life Expectancy/y | Continent | Country | Depandance | Room |
|---|---|---|---|---|---|---|---|---|---|---|
| 1 | 1 | John | 5-10 | 20-40 | 11-15 | <2 | EU | GE | D2 | 11 |
| 2 | 2 | Alex | 11-25 | 20-40 | <5 | <2 | EU | GE | D1 | 155 |
| 3 | 3 | Sarah | 11-25 | >80 | 31-35 | 8-10 | EU | GE | D4 | 12 |
| 4 | 4 | John | 26-35 | <20 | <5 | 4-6 | EU | FR | D4 | 12 |
| 5 | 5 | Philipp | 5-10 | 41-60 | 31-35 | 4-6 | NAM | USA | D3 | 12 |
| 6 | 6 | John | 11-25 | 61-80 | 11-15 | 4-6 | NAM | USA | D3 | 44 |

Figure 2b — Columnar Data Structures

215

| Record | Machine ID |
|---|---|
| 1 | 1 |
| 2 | 2 |
| 3 | 3 |
| 4 | 4 |
| 5 | 5 |
| 6 | 6 |

216

| Record | Operator |
|---|---|
| 1,4,6 | John |
| 2 | Alex |
| 3 | Sarah |
| 5 | Phillipp |

217

| Record | Temperature/°C |
|---|---|
| 1,5 | 5-10 |
| 2,3,6 | 11-25 |
| 4 | 26-35 |

218

| Record | Moisture/% |
|---|---|
| 4 | <20 |
| 1,2 | 20-40 |
| 5 | 41-60 |
| 6 | 61-80 |
| 3 | >80 |

219

| Record | Failure Rate/% |
|---|---|
| 2,4 | <5 |
| 1,6 | 11-15 |
| 3,5 | 31-35 |

220

| Record | Life Expectancy/y |
|---|---|
| 1,2 | <2 |
| 4,5,6 | 4-6 |
| 3 | 8-10 |

221

| Record | Continent |
|---|---|
| 1,2,3,4 | EU |
| 5,6 | NAM |

222

| Record | Country |
|---|---|
| 1,2,3 | GE |
| 4 | FR |
| 5,6 | USA |

223

| Record | Depandance |
|---|---|
| 2 | D1 |
| 1 | D2 |
| 5,6 | D3 |
| 3,4 | D4 |

224

| Record | Room |
|---|---|
| 1 | 11 |
| 3,4,5 | 12 |
| 6 | 44 |
| 2 | 155 |

DETERMINATION OF RULES BY PROVIDING DATA RECORDS IN COLUMNAR DATA STRUCTURES

PRIORITY

The present application claims priority to European Patent Application No. 11168163.1, filed on 31 May 2011, and all the benefits accruing therefrom under 35 U.S.C. §119, the contents of which in its entirety are herein incorporated by reference.

BACKGROUND

The present invention relates generally to the field of data mining, and more particularly, to the field of rule determination for data mining.

Data mining is the process of extracting patterns from large data sets. Data mining allows extracting knowledge from enormous amounts of data which are not suitable for human interpretation or evaluation due to their structure and/or amount. A common problem in data mining is that non-hypothesis driven approaches tend to be slow and can therefore cannot be used interactively. Hypothesis driven approaches based, for example, on the use of online analytical process (OLAP) cubes typically require less computing power but are confined to the existence and use of a hypothesis. Often, however, such a hypothesis is not known and it is an aim of data mining to automatically determine plausible hypotheses and to further execute a drill down analysis based on a particular hypothesis. Due to the enormous processing power required by non-hypothesis driven approaches, there is a need for real-time and interactive non-hypothesis driven data mining approaches that can process huge amounts of data.

U.S. Patent Publication No. 2010/0235335 discloses a method for providing a column store database system that supports high throughput read performance. U.S. Patent Publication No. 2005/0278286 discloses a method for providing a data mining interface during the construction of a query for filtering database columns and for displaying the filtered information to the user. Prior art columnar database systems are not able to provide for an interactive real-time identification of new candidate rules. Known columnar databases are, for example, Vertica™, ParAccel™, Infobright™, Sybase IQ™, and others.

SUMMARY

In one aspect, a computer-implemented method for determining first rules, where each first rule includes a source attribute-value pair and a destination attribute-value pair includes providing a columnar database that includes a plurality of columnar data structures, each columnar data structure being associated with one column attribute and including one or more column entries. The method also includes providing first data records that are stored in the columnar database, where each first data record has a plurality of first attribute-value pairs, each value of the first attribute-value pairs is stored in one of the columnar data structures associated with the respective column attribute, and each column entry is associated with one value of the respective column attribute and includes counting information that is indicative of a number of first data records having the respective first attribute-value pair. The method also includes providing mask data structures, each mask data structure having the same structure as one of the columnar data structures, the mask data structures including one or more second attribute-value pairs. The method further includes selecting second data records as a sub-set of the first data records by intersecting the columnar data structures and the mask data structures, the second data records selectively including first data records which include at least one first attribute-value pair matching one of the one or more second attribute-value pairs. The method further includes: selecting one of the column attributes and one value being contained in the column data structure associated with the selected column attribute as the destination attribute-value pair; creating one second rule for each first attribute-value pair of the second data records, where the first attribute-value pair is used as source attribute-value of the second rule and the selected destination attribute-value pair is used as the destination attribute-value pair of the second rule; calculating, for each second rule, a co-occurrence-count between its respective source attribute-value pair and its destination attribute-value pair; and specifically selecting one or more of the second rules as the first rules in dependence on the calculated co-occurrence-count.

In another aspect, a computer program product for determining first rules, where each first rule includes a source attribute-value pair and a destination attribute-value pair includes a computer readable storage medium having computer readable program code embodied therewith, the computer readable program code being configured for performing a method that includes providing a columnar database that includes a plurality of columnar data structures, each columnar data structure being associated with one column attribute and including one or more column entries. The method also includes providing first data records that are stored in the columnar database, where each first data record has a plurality of first attribute-value pairs, each value of the first attribute-value pairs is stored in one of the columnar data structures associated with the respective column attribute, and each column entry is associated with one value of the respective column attribute and includes counting information that is indicative of a number of first data records having the respective first attribute-value pair. The method also includes providing mask data structures, each mask data structure having the same structure as one of the columnar data structures, the mask data structures including one or more second attribute-value pairs. The method further includes selecting second data records as a sub-set of the first data records by intersecting the columnar data structures and the mask data structures, the second data records selectively including first data records which include at least one first attribute-value pair matching one of the one or more second attribute-value pairs. The method further includes: selecting one of the column attributes and one value being contained in the column data structure associated with the selected column attribute as the destination attribute-value pair; creating one second rule for each first attribute-value pair of the second data records, where the first attribute-value pair is used as source attribute-value of the second rule and the selected destination attribute-value pair is used as the destination attribute-value pair of the second rule; calculating, for each second rule, a co-occurrence-count between its respective source attribute-value pair and its destination attribute-value pair; and specifically selecting one or more of the second rules as the first rules in dependence on the calculated co-occurrence-count.

In yet another aspect, a data processing system is operatively coupled to a columnar database, the data processing system including a processor, and a non-transitory storage medium including instructions which, when executed by the processor, execute a method for determining first rules, where each first rule includes a source attribute-value pair and a destination attribute-value pair. The method includes providing a columnar database that includes a plurality of columnar data structures, each columnar data structure being associated with one column attribute and including one or more column entries. The method also includes providing first data records that are stored in the columnar database, where each first data record has a plurality of first attribute-value pairs, each value of the first attribute-value pairs is stored in one of the columnar data structures associated with the respective column attribute, and each column entry is associated with one value of the respective column attribute and includes counting information that is indicative of a number of first data records having the respective first attribute-value pair. The method also includes providing mask data structures, each mask data structure having the same structure as one of the columnar data structures, the mask data structures including one or more second attribute-value pairs. The method further includes selecting second data records as a sub-set of the first data records by intersecting the columnar data structures and the mask data structures, the second data records selectively including first data records which include at least one first attribute-value pair matching one of the one or more second attribute-value pairs. The method further includes: selecting one of the column attributes and one value being contained in the column data structure associated with the selected column attribute as the destination attribute-value pair; creating one second rule for each first attribute-value pair of the second data records, where the first attribute-value pair is used as source attribute-value of the second rule and the selected destination attribute-value pair is used as the destination attribute-value pair of the second rule; calculating, for each second rule, a co-occurrence-count between its respective source attribute-value pair and its destination attribute-value pair; and specifically selecting one or more of the second rules as the first rules in dependence on the calculated co-occurrence-count.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

A computer-implemented method, a data processing system and a corresponding computer program product for automatically determining rules are provided, with exemplary embodiments being discussed below in detail. Various embodiments provide for a real-time interactive analysis suitable to solve a variety of data-mining related questions. For example, key influence factors that lead to problems at a manufacturing site can quickly be identified. Customers which share a given behavior can be identified and information which is not significant for a selected attribute-value can be identified and skipped in a future data analysis.

Figure 1:
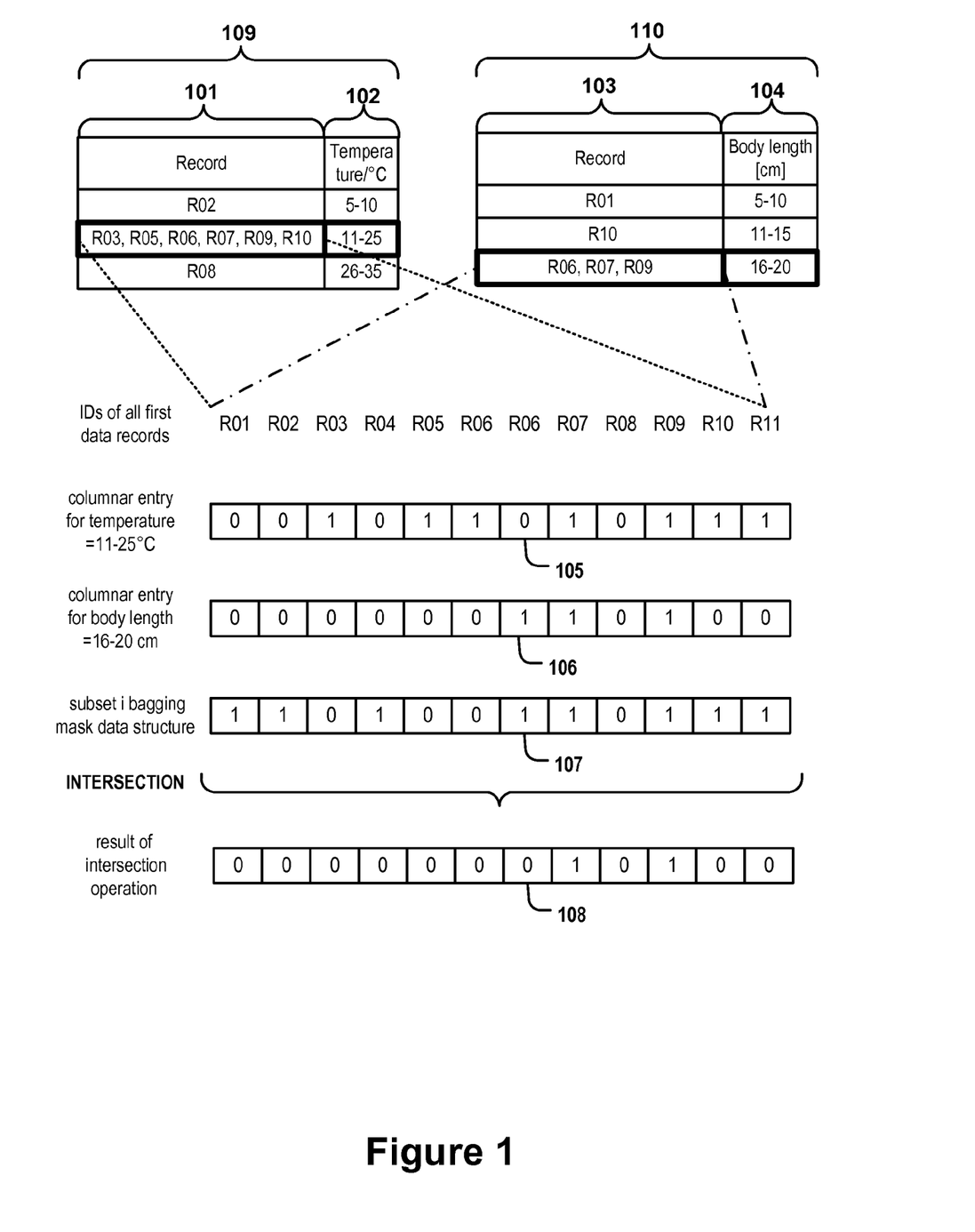
FIG. 1 depicts column entries represented as bit vectors in accordance with an embodiment.

FIG. 1 depicts a first columnar data structure 109 and a second columnar data structure 110. The first columnar data structure 109 has assigned the column attribute 'temperature', the second columnar data structure 110 has assigned the column attribute 'body length' of an animal, whereby the temperature is the temperature of the environment in which an animal was brought up. Three unique temperature ranges have been defined which are stored in column 102 of the first columnar data structure 109. For each of the three column entries of the first columnar data structure 109, a set of data record identifiers (IDs) is stored in the record column 101. The total data set of the embodiment depicted in FIG. 1 comprises eleven first data records R01-R11. Each data record corresponds to one animal having a particular body length. The data structures depicted in FIG. 1 can be used to automatically determine if the temperature correlates and possibly has an impact on the body length. The individual length of each animal is stored in columns 103 and 104 of the second columnar data structure 110. The column entry corresponding to temperature range 11-25° C. is represented as bit vector 105. The column entry corresponding to body length is represented as bit vector 106. The bit vector has as many bit positions as first data records exist in the total data record, i.e., eleven positions.

The total data set is divided into k different sub-sets of second data records, whereby i and k are integers and 1<=i<=k. The content of each created data record sub-set is also represented in a sub-set bagging mask data structure on which set operations can easily performed, in this case, a bit vector 107. In case a user wants to automatically calculate second rules for said data record sub-set, and in case the temperature range 11-25° C. is used as a potential source attribute-value pair and the body length 16-20 cm is used as a potential destination attribute-value pair, the number of data records belonging to said sub-set i and which comprise both the source attribute-value pair as well as the destination attribute-value pair can easily and quickly be calculated by intersecting the bit vectors 105-107. The resulting bit vector 108 is indicative of the number and type of data records fulfilling all the above mentioned criteria. Intersecting a columnar data structure with a mask data structure is executed analogously.

Figure 2A:
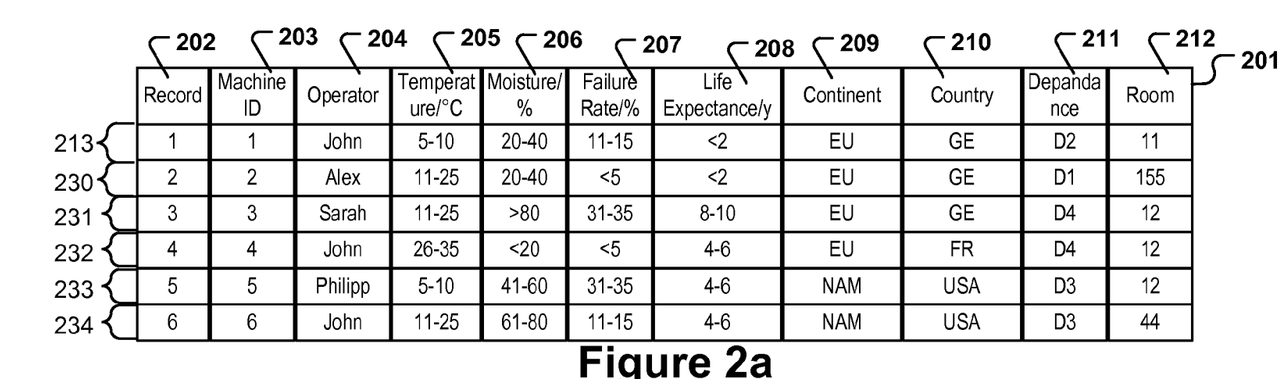
FIG. 2a depicts a set of data records stored in a relational database table.

FIG. 2a depicts six first data records 213, 230-234 stored in a relational database table 201. Each first data record comprises a record ID being unique for said record. Each first data record comprises a plurality of first attribute-value pairs. For example, first data record 213 comprises the attribute-value pairs operator=John, temperature=5-10° C., moisture=20-40%, failure rate=11-15% and so on. Each attribute of the first data structures is represented in a relational database table as a column 202-212 and each attribute-value pair of said first data records 210 is represented as a data value in a cell having an index corresponding to the first data records and having a column index according to the respective attribute column. Columnar data structures do not comprise NULL values, thereby saving additional space compared to relational databases.

Figure 2B:
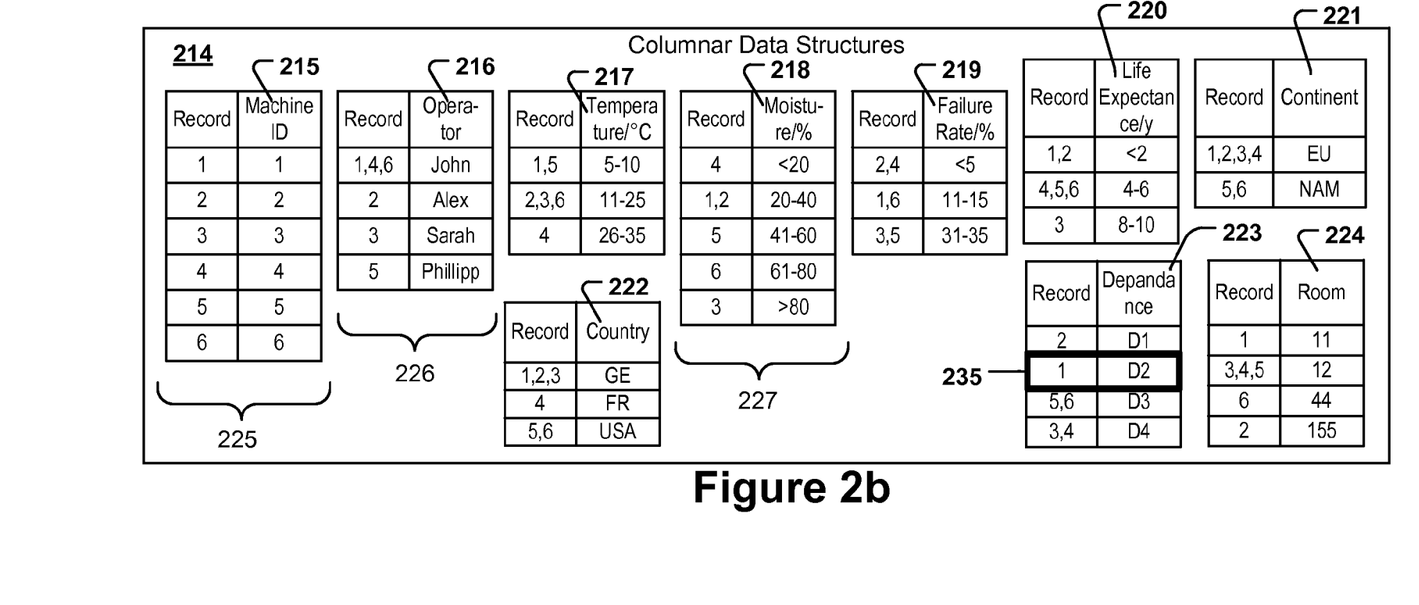
FIG. 2b depicts the data records of FIG. 2a stored in columnar data structures in accordance with an embodiment.

FIG. 2b depicts the six first data records of FIG. 2a stored to a set of columnar data structures. Each columnar data structure 225, 226, 227 has assigned a column attribute 215-

224 being particular to the respective columnar data structure. Contrary to a relational database table, each data value having been assigned to a particular attribute of a first data record is contained in a columnar data structure corresponding to said attribute only once. This is advantageous, because the amount of storage required for storing all first data records in columnar data structures is significantly smaller compared to storing said data records in a relational database table. Each columnar data structure comprises one or more column entries 235. For example, columnar data structure 216 comprises the column entries [(1, 4, 6), (John)] and [(2), (Alex)]. The numbers 1, 4, 6 in the record column of said columnar data structure are indicative of the record identifier of all first data records comprising the attribute-value pair 'operator=John'. Accordingly, the numbers being contained in the record-column of a column entry comprise counting information, the counting information being indicative of the number of data records having an attribute-value pair according to which the attribute of said attribute-value pair corresponds to the column attribute of the columnar data structure of the column entry and according to which the value of said attribute-value pair corresponds to the value being contained in said column entry. In the depicted example, column entry [(1, 4, 6), (John)] comprises counting information indicating that three first data records comprise the first attribute-value pair 'operator=John'.

Figure 3:
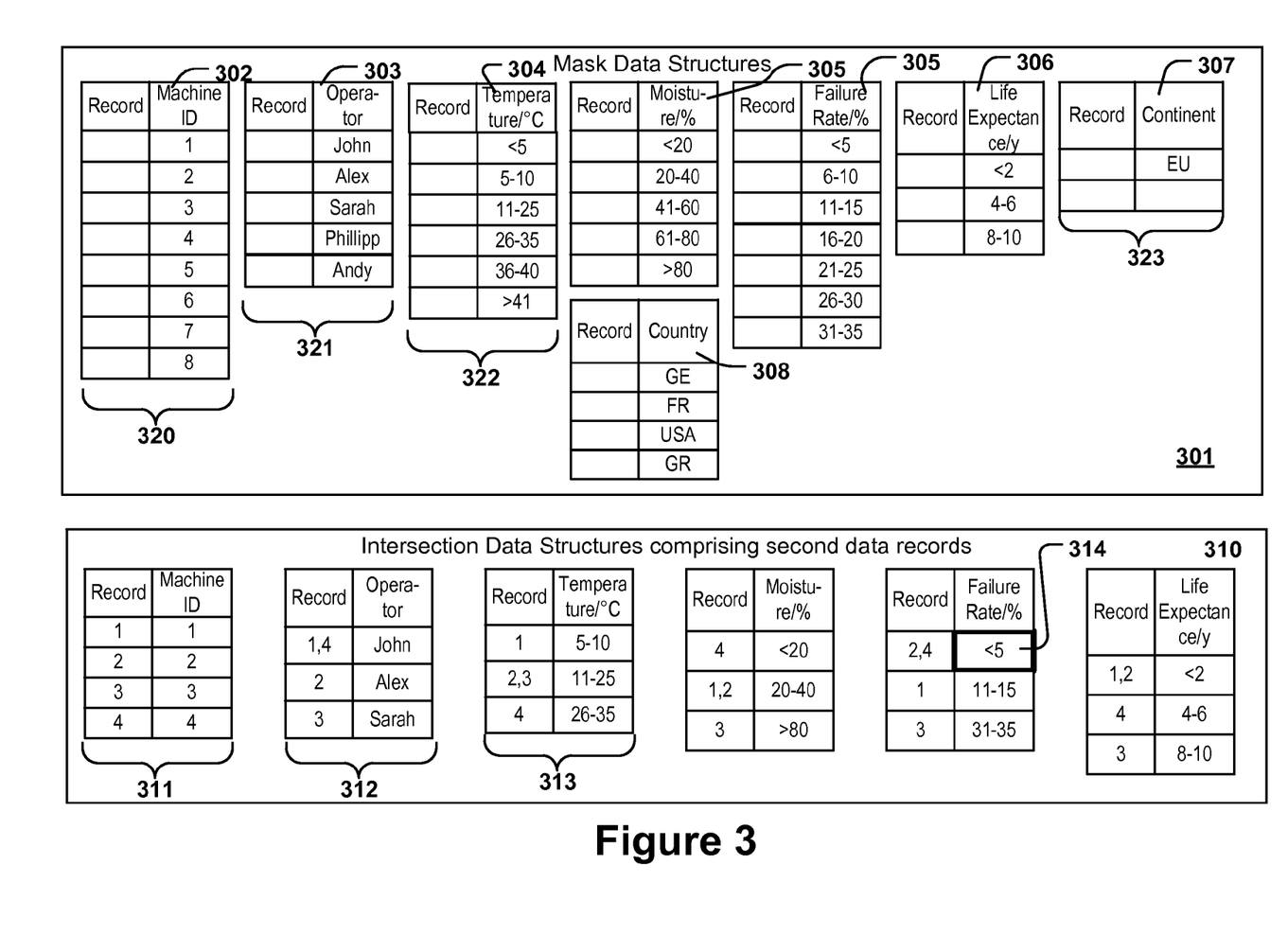
FIG. 3 depicts mask data structures and an intersecting data structure in accordance with an embodiment.

FIG. 3 depicts a set 301 of mask data structures and a set 310 of intersecting data structures. The structure of the mask data structures 320-323 is identical to the structure of the columnar data structures depicted in FIG. 2b. Each mask data structure has assigned a column attribute and comprises a set of data values which are used to execute an intersection operation with data values and corresponding data records being stored to a columnar data structure having assigned the same column attribute. According to the depicted example in FIG. 3, all mask data structures comprise the same or even an extended set of 'permitted values' except for the data structure having assigned column attributes 'continent' 307. Although the first data records depicted in FIG. 2 have assigned to the 'continent' attribute either the value 'Europe' ('EU') or 'North America' ('NAM'), the mask data structure 323 comprises as a 'permitted value' solely the data value 'Europe'. By calculating an intersection between the columnar data structures and the mask data structures of FIG. 2b and FIG. 3, one or more intersection data structures are generated which comprises only a sub-set of the first data records, herein also referred to as a set of 'second data records'. All first data records which do not comprise the attribute-value pair 'continent=Europe' are filtered out during the intersection operation. The second data records being contained in the intersection data structures 310 comprise only those first data records having assigned the attribute-value pair 'continent=Europe'. Accordingly, only 4 out of 6 first data records are contained in the intersection data structures and the record columns of the intersection data structures comprise counting information being indicative solely of the number of the second data records comprising said attribute-value pair.

It is possible to use multiple different values stored to different mask data structures at the same time in order to exclude all first data records which do not comprise a particular combination of attribute-value pairs. For example, it is possible to create a set of first data records all comprising the attribute-value pairs 'continent=Europe', 'temperature <5° C.' and 'life expectancy=4-6' by applying mask data structures having the values 'Europe', '5° C.' and '4-6' in the respective mask data structures. The intersection operation can be executed very efficiently, because by applying the mask data structures on the columnar data structures all the filter criteria are applied on the first data records stored to the columnar data structures concurrently (see FIG. 1 for an intersection operation involving multiple data structures). In addition, the compact and dense way of representing information provided by columnar databases according to some embodiments allows loading the totality of first data records into the working memory.

According to some embodiments, a user can select a particular attribute-value pair as destination attribute-value pair of the first rules to be determined. Data value '<5' 314 belongs to the attribute-value pair 'failure rate=<5%'. The destination attribute-value pair represents the 'current goal' of a data analysis procedure returning one or more first rules as results. For example, by selecting the attribute-value pair of 'failure rate<5%', e.g. by applying corresponding mask data structures on the first data records stored to the columnar data structures, it is possible to determine all attribute-value pairs having an impact on or correlating with said destination attribute-value pair. Accordingly, it is possible to determine, by specifying a destination attribute-value pair, whether the available first data records should be analyzed in respect to determining predictors for the failure rates of the machines or, alternatively, e.g. for the life expectancy of the machines. This is advantageous, because the 'target' of a data mining operation can be determined dynamically and flexibly by selecting a destination attribute-value pair and determining a set of first and second rules in respect to said selected destination attribute-value pair.

According to some embodiments, the destination attribute-value is specified and selected by a user action on an OLAP cube.

Figure 4:
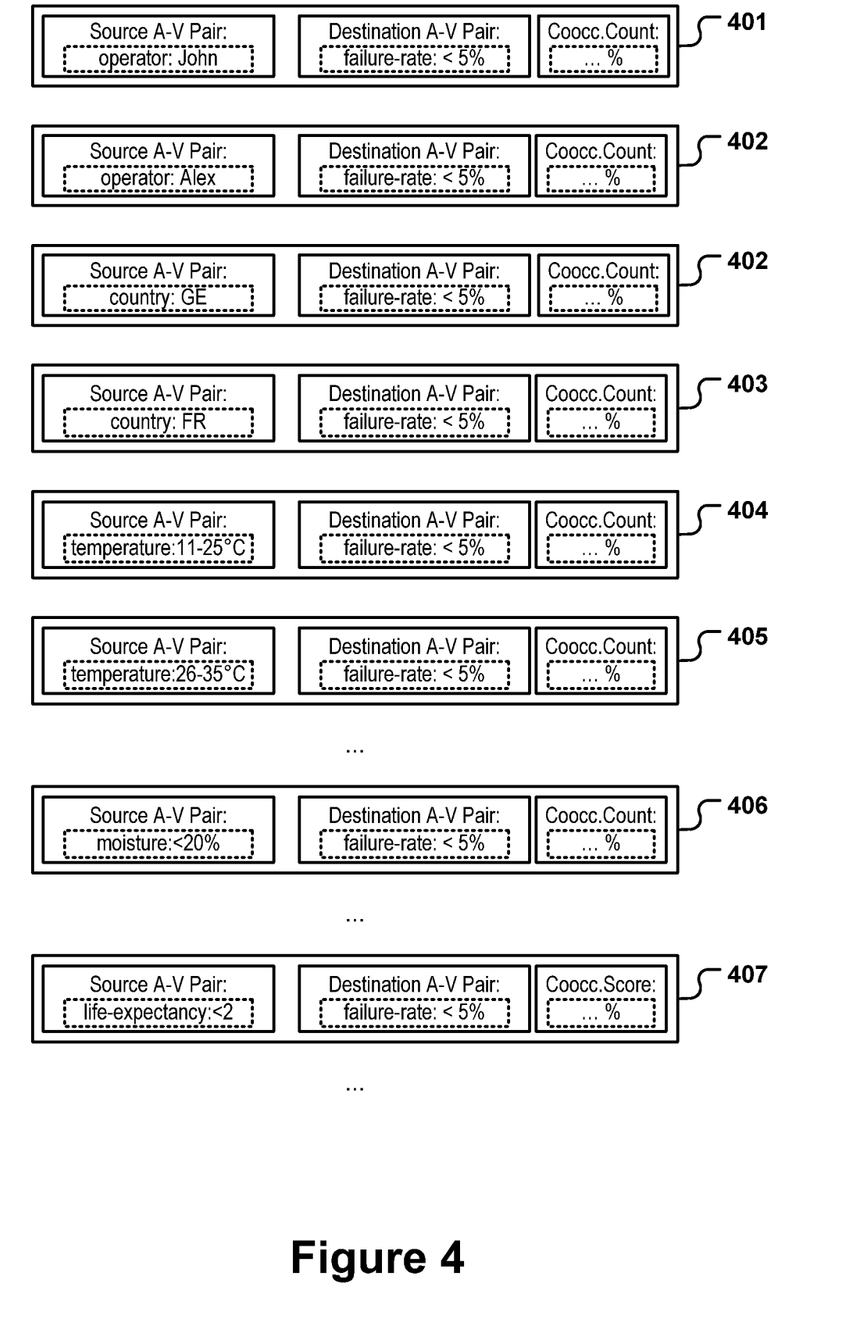
FIG. 4 depicts a set of second rules in accordance with an embodiment.

FIG. 4 depicts a set of second rules 401-407, whereby each second rule comprises the selected destination attribute-value pair ('failure rate<5%'), a source attribute-value pair (e.g. 'operator=John') and a co-occurrence count. If a particular attribute-value pair never co-occurs with the destination attribute-value pair, no corresponding second rule is created. For example, the operator Sarah never operated a machine having a failure rate less than 5%. Accordingly, no second rule can be created comprising 'operator=Sarah' as source attribute-value pair.

Figure 5:
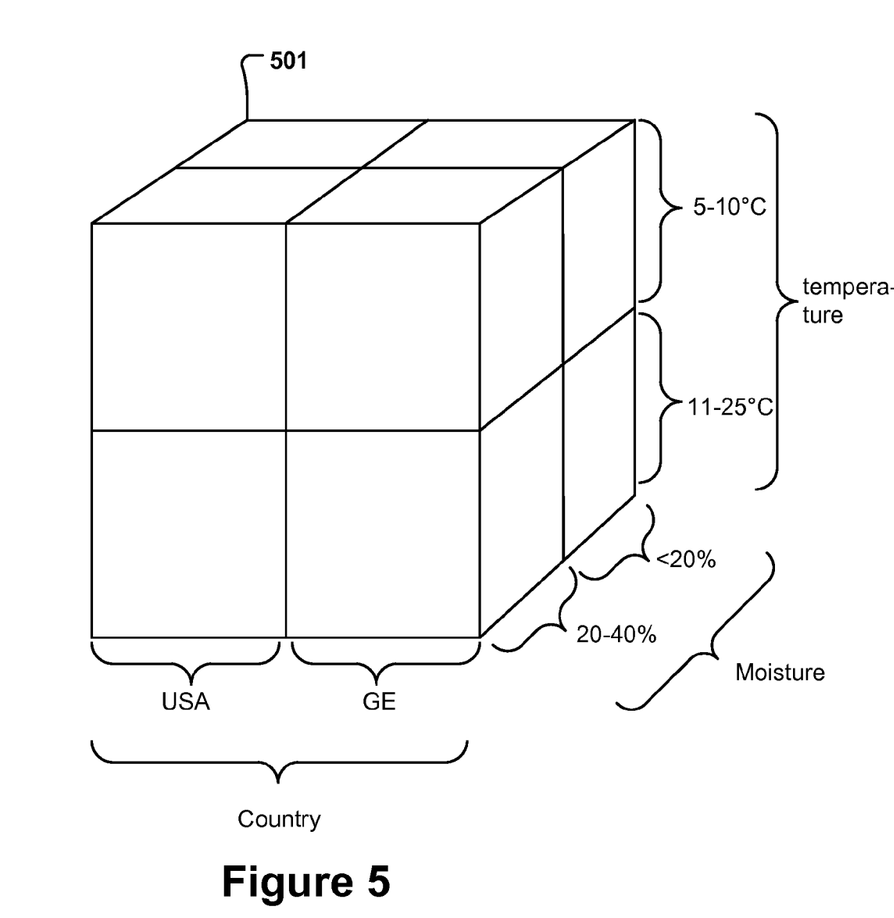
FIG. 5 depicts an OLAP cube having assigned third attribute-value pairs in accordance with an embodiment.

FIG. 5 depicts an OLAP cube 501 having assigned third attribute-value pairs, e.g. 'country=USA' and 'country=GE' along a first dimension of the OLAP cube, third attribute-value pairs 'moisture=20-40%' and 'moisture=<20%' along a second dimension and third attribute-value pairs 'temperature=5-10° C.' and 'temperature=11-25° C.' along a third dimension. A program routine of an application program or a user by means of a GUI may trigger a slicing, dicing, pivoting, drill-down and/or roll-up event on the OLAP cube, thereby selecting the third attribute-value pairs having been assigned to a particular current dimension or hierarchy. The selected third attribute-value pairs are used for specifying second attribute-value pairs which again are used for selecting one or more second data records from a plurality of first data records. Mask data structures are created comprising said specified second attribute-value pairs and are applied on the first data records stored to the columnar data structures, thereby dynamically selecting sub-sets of data records for further analysis. For example, the OLAP cube may be used to execute a drill down analysis on all first data records starting at the continental level and drilling down to all data records (and machines represented by said data records) having assigned a particular country, a particular branch of a company or a particular room.

According to embodiments, each OLAP cube based drill down analysis is a hypothesis driven data analysis, because the predefined assignment of third attribute-value pairs to the OLAP cube represents assumptions and hypotheses, namely that a user executing a drill down analysis may be interested in the categories 'continent', 'country', or 'room'.

According to some embodiments, each OLAP cube based drill down analysis alternates with an automatic determination of first rules. The first rules are automatically derived from a current sub-set of second data records selected by the mask data structures specified in a previous OLAP cube based event.

According to some embodiments, the user is provided, e.g. by means of a graphical user interface (GUI), with selectable GUI elements for selecting a destination attribute-value pair to be used during the automated determination of the first rules for the current data records. For example, when the user selects a particular continent assigned to the OLAP cube, a plurality of second data records of said country are selected which comprise a plurality of attribute-value pairs, e.g. for the attributes moisture, failure rate, operator, temperature and so on. The user can initiate the execution of a non-hypothesis driven determination of first rules by evaluating said plurality of second data records as described above. If the user is interested in conditions leading to a frequent break down of a machine, he may for example select the attribute-value pair 'failure rate=31-35%' as destination attribute-value pair. According to some embodiments, the user may deselect some attribute-value pairs and may thereby prohibit that said attributes are considered as source attributes.

According to the depicted embodiment, the following operations may be executed:

1. The user selects by means of the GUI, a plurality of first data records and columns from the OLAP cube.
2. The user selects one column attribute as a destination attribute and one value of said columnar data structure as a corresponding value
3. Automatically, k random sub-sets of first data records are created which share a common set of shared data records.
4. Using the columnar structures, the co-occurrence counts for all combinations of source attribute-value pairs and the destination attribute-value pair are determined, whereby the co-occurrence counts of second rules (and corresponding source- and destination attribute-value pairs) being contained in multiple sub-sets are calculated only once.
5. One or more second rules are determined for each of the k sub-sets.
6. Significant second rules are selected for each of the k sub-sets, whereby the significance is determined in dependence on the respectively calculated co-occurrence count.
7. Rules that were found in a minimum fraction of sub-sets (e.g. 70% of all k sub-sets) are used as first rules and are presented to the user in order of their average co-occurrence count (or confidence score).

Operations 4-6 may be performed in parallel in some embodiments.

Figure 6:
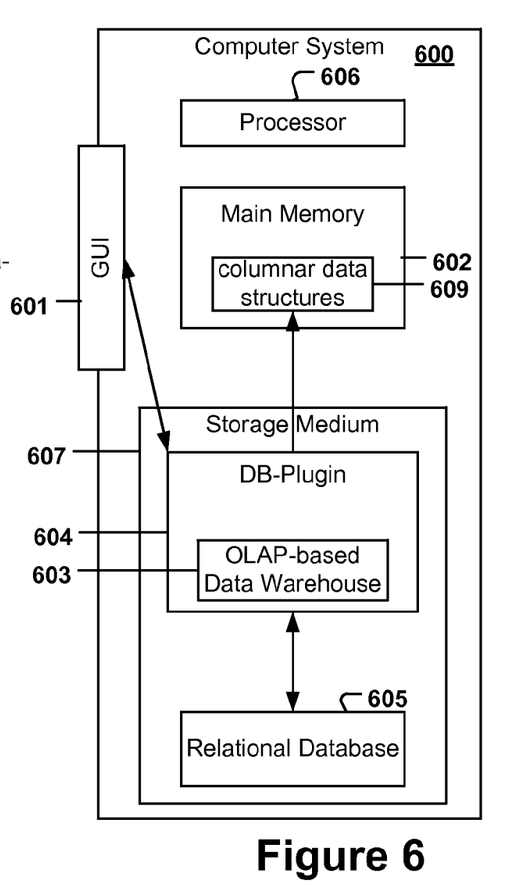
FIG. 6 depicts a block diagram of a computer system comprising a GUI and an OLAP-based data warehouse in accordance with an embodiment.

FIG. 6 depicts a block diagram of a computer system 600 comprising a GUI 601 allowing a user to trigger a slicing, dicing, pivoting, drill-down and/or roll-up event on an OLAP cube for executing hypothesis driven data analysis. The GUI also allows the user to select a destination attribute-value pair. The computer system comprises a processor 606 and a computer readable storage medium 607 comprising computer interpretable instructions for operating a database plug-in 604 of a relational database 605. The database plug-in 604 comprises a module 603 providing for an OLAP based data warehouse which can be controlled by a user by means of a GUI. Said GUI can be used for performing a dynamic, hypothesis-driven as well as a non-hypothesis driven analysis of data stored to the relational database 605. The plug-in reads data records from the relational database, re-organizes the data into columnar data structures and stores said columnar data structures 609 in the memory 602.

According to embodiments, the data in the columnar data structures in the main memory are periodically refreshed from the persistent relational database 605 serving as data basis for the OLAP data warehouse 603.

A 'column-oriented database' or 'columnar database' is a database that stores its content, i.e., data records comprising attribute-value pairs, by column rather than by row. A database must transform its two-dimensional table into a one-dimensional series of bytes in order to write its data content either to the RAM and/or to a hard drive. A row-oriented database serializes all of the values in a row together, then the values in the next row, and so on. In contrast to row-oriented databases, a column-oriented database writes all values of a column together into memory in a serial manner, then the values of the next column, and so on. A 'columnar data structure' as used herein is a table data structure having assigned a column specific attribute, also referred to as 'column attribute, and comprising a set of column entries, whereby each column entry comprises a data value which is unique for said columnar data structure and which has been assigned to a corresponding 'record attribute' of one or more data records.

The expression 'matching attribute-value pairs' as used herein refers to any operation comparing a first and a second attribute-value pair and returning a Boolean 'true' or 'false' response. For example, such a comparison can comprise determining whether the attributes of the first and the second attribute-value pair are identical, and may further comprise determining if in addition the value of the first attribute-value pair is equal to the value of the second attribute-value pair. In case the attribute as well as the value of the compared first and second attribute-value pairs are identical, a positive matching result 'true' is returned. Depending on the embodiment, matching attribute-value pairs may be based on an overlay of bit vectors or other data structures.

A 'mask data structure' is a data structure having the same structure as a columnar data structure. A mask data structure has assigned one columnar attribute and may comprise one or more column entries, each column entry comprising a data value but no counting information. By intersecting a mask data structure with a columnar data structure having assigned the same column attribute, all data records comprising an attribute-value pair matching the values contained in the mask data structure and its particular columnar attribute can be determined.

The term 'rule' as used herein encompasses a data structure comprising a source attribute-value pair and a destination attribute-value pair. In addition, a rule may comprise a co-occurrence count being indicative of the frequency of the source attribute-value occurring together with the destination attribute-value within an evaluated data set. A rule comprising a co-occurrence count may therefore indicate how frequent a particular attribute-value pair, the source attribute-value pair, co-occurs with another attribute-value pair of interest, i.e., the destination attribute-value pair. The task of automatically extracting rules having a particular co-occurrence count by evaluating a set of data records can accordingly be regarded as a data mining task for extracting correlating attribute-value pairs.

The term 'machine-readable medium' should be taken to include a single medium or multiple media (e.g. a centralized or distributed database, and/or associated caches and servers) that store data and/or computer interpretable instructions. The term 'computer-readable non-transitory storage medium' shall accordingly be taken to include, but not be limited to, solid-state memories, optical and magnetic media, etc. such as, but not limited to, any type of disk including floppy disks, optical disks, CD-ROMs, and magnetic-optical disks, read-only memories (ROMs), random access memories (RAMs), an erasable programmable read-only memory (EPROM or Flash memory), an optical fiber, magnetic or optical cards, or any type of media suitable for storing electronic instructions.

A typical task in data mining is to determine, by analyzing a set of data records comprising a multitude of attribute-value pairs, those attribute-value pairs being indicative of the presence of a particular destination attribute-value pair. For example, an operator of a machine farm of a company may be interested in determining all influence factures such as moisture, temperature, age, location, or other attributes which may influence the life expectancy of the machine. Such a relation can typically be assumed if a statistical correlation between a particular attribute-value pair, e.g. 'temperature >50° C.', and a particular destination attribute-value pair 'life-expectancy <3 years' can be found by analyzing data records having been gathered from a plurality of machines. Various embodiments allow determining such influence factors flexibly and interactively. When combined with hypothesis-driven data mining approaches such as OLAP cubes, some embodiments provide for a highly advantageous data mining approach allowing to switch between hypothesis-driven and non-hypothesis driven approaches dynamically as needed.

A 'destination attribute-value pair' is any attribute-value pair of a rule a user is interested in and for which he wants to automatically extract predictive parameter values from a plurality of data records. For example, a user may evaluate a plurality of data records comprising a record of machine states in combination with a plurality of environmental conditions such as temperature, moisture, age of the machine, the operator of the machine, and the like. Several state values, e.g. 'failure' and 'operable', have been recorded. By selecting the attribute-value pair 'state=failure' as destination attribute-value pair, the user may trigger, according to some embodiments, the automatic determination of those attribute-value pairs, herein also referred to as 'source attribute-value pairs' which correlate with (and may therefore be assumed to cause) the destination attribute-value pair (here: the machine failure). For example, in case it was found that a temperature above 30° C. significantly and positively correlates with a failure state of the machine, a rule <<if 'temperature >30° C.', then 'state=failure'>> would be derived in the form of a rule comprising 'state=failure' as destination attribute-value pair and 'temperature >30° C.' as source attribute-value pair.

Storing the data records to be analyzed in columnar data structures and intersecting said structures with mask data structures is advantageous, as this approach exploits the internal structure of the columnar data structures for determining an intersecting set of first data records matching the attribute-value pairs of the mask data structures. This is particularly efficient, because set operations for determining intersecting data structures can work directly on existing data structures without the need to execute a transformation. According to some benchmarking tests, the time for processing data records organized in a conventional relational database was measured to rise from 20 msec for 1 million data records to 85 msec for 3 million data records. To the contrary, the processing time for 3 million data records having been organized in columnar data structures was observed to be less than 5 msec.

For example, a mask data structure could comprise a columnar data structure having assigned the columnar attribute 'state' and containing only one data value 'failure'. A columnar database comprises a plurality of data records being stored to a plurality of columnar data structures. One of said columnar data structures has assigned the columnar attribute 'state' and has a plurality of different columnar data entries, e.g. for the states 'operative', 'running', 'failure', and 'unknown'. By executing an intersection operation of said mask data structure with the columnar data structures of said columnar database, selectively those data structures can be determined highly efficiently which have assigned the value 'failure'.

Representing data records in columnar data structures is advantageous, because large data sets typically used for data mining cannot be held in memory if stored to tables of a relational database. The storage space required by a columnar database is typically 10-100 times smaller than the space required by a relational DBMS. As columnar data structures provide for a highly condensed form of data representation, they allow loading large data sets into the working memory, thereby saving time by avoiding slow read/write access operations on a hard disc. A table with 50 columns each having at least 50 different column entries representing or pointing to 5 million data records, according to some implementation examples, consume only about 1 GB memory. Depending on the embodiment, the counting information can also be inherently provided by the data structure of a column entry.

The counting information can be, for example, a numerical value being indicative of all first data records having a particular attribute-value pair, e.g., having the attribute 'moisture' and a value '20-30%'. Alternatively, the counting information may consist of a set of identifiers of all first data records comprising said attribute-value pair. In this case, the size of said identifier set acts as counting information.

A co-occurrence count calculated for a particular source- and destination attribute-value pair is a numerical value which is indicative of the number of data records which comprise both the source attribute-value pair and the destination attribute-value pair. The co-occurrence count can likewise be any number calculated as a derivative of said numerical data value. According to exemplary embodiments, the co-occurrence count is obtained by calculating a ratio of the observed co-occurrence events and the statistically expected probability that the source- and the destination attribute-value pair co-occur by chance. For example, if the source-attribute-value pair has a frequency of 40% in a set of first data records and the destination attribute-value pair has a frequency of 35% in said set of first data records, a statistically expected co-occurrence frequency of the source and the destination attribute-value pair is 0.4×0.35=0.135=13.5%. A co-occurrence count could in this case be calculated e.g. as the ratio of the observed co-occurrence frequency and the statistically expected co-occurrence frequency. For example, in case the source attribute-value pair and the destination attribute-value were observed to co-occur together in 25% of all first data records, the co-occurrence count cc could be calculated as:

$$cc = (\text{observed } co\text{-}occ. \text{ frequency/statistically expected } co\text{-}occ. \text{ frequency}) = 0.25/0.135 = 1.85.$$

Depending on the embodiment, various statistical tests may be employed to calculate a co-occurrence count from the number of first data records having been observed to comprise both the source- and the destination attribute-value pair. In case such a statistical test is used for calculating the co-occurrence count, said test may in addition provide for a confidence score being indicative of the significance of a result, i.e. being indicative on the reliability of the assumption that the occurrence of the source attribute-value pair has an impact on the occurrence frequency of the destination attribute-value pair.

According to some embodiments, all co-occurrence-counts of all combinations of attribute-value pairs with the one destination attribute-value pair are represented in the second rules and are calculated simultaneously by exploiting said columnar data structure, e.g. by executing a set operation such as an intersection operation on the columnar data structures and the mask data structures. By intersecting the mask data structure and the columnar data structure, the counting information can be determined and second data records can be selected simultaneously.

According to some embodiments, specifically selecting one or more of said second rules comprises an operation being selected from the group comprising sorting the second rules according to their co-occurrence-count in descending order and selecting the first n sorted second rules as n first rules, wherein n is an integer >0; determining n second rules having a co-occurrence-count that exceeds a first threshold and selecting said n second rules as first rules, wherein n is an integer >0; and calculating for each second rule a co-occurrence statistic providing for each of said second rules a significance score and selecting n of said second rules having a significance score that exceeds a second threshold, wherein n is an integer >0.

According to some embodiments, the co-occurrence statistic is based on a chi-square test, a T-test or a Fisher' exact test or any other related statistical test.

According to some embodiments, each rule for which a co-occurrence statistic was applied has assigned a confidence value, the confidence value being determined by calculating e.g. the fraction of first data records comprising a particular source attribute-value pair in combination with the destination attribute-value pair of a particular rule and the fraction of first data records comprising said particular source attribute-value pair. The detailed calculation of the confidence value depends on the individual statistical test. A rule is considered as significant if its confidence is higher than a threshold, whereby said threshold may depend on the statistical test used.

Rule selection, according to embodiments, in effect allows for the automated determination of those source attribute-value pairs having the highest impact on and/or the having the highest predictive value for the occurrence of the destination attribute-value pair.

According to some embodiments, pruning is executed in order to reduce the number of second rules for which a co-occurrence count has to be created. The term 'pruning' as used herein encompasses the automatic determination of columnar data structures and corresponding columnar attributes which do not have an impact on the presence of a destination attribute-value pair, whereby said determination is not based on calculating a co-occurrence-count between a source attribute-value pair and said destination attribute-value pair. For example, a columnar data structure comprising for each unique data value only one single record-ID is automatically excluded from further data analysis if pruning is applied, because said distribution of record-IDs implies that the column attribute corresponding to said columnar data structure, e.g. 'machine-ID' has no impact on the presence of the destination attribute-value pair.

Pruning may imply excluding all attribute-value pairs from data analysis if their evaluation can be automatically and without calculating a co-occurrence-count determined as unsuited for determining source attribute-value pairs having an impact on the occurrence of the destination attribute-value pair. For example, if a particular attribute-value pair appears very often or very seldom compared to the frequency of the destination attribute-value pair, it can be implicitly derived from this information that said attribute-value pair is not suited as predictor for the presence of the destination attribute-value pair. Using pruning is advantageous, because the number of second rules generated can be reduced by making use of information which is inherent to the columnar data structures without executing additional cost intensive calculation. As a result, the calculation of a co-occurrence-count can be avoided for a multitude of attribute-value pairs. The number of generated second rules is reduced and the task of selecting the first rules from said second rules is accelerated as the number of second rules whose co-occurrence-count has to be evaluated is reduced. Depending on the embodiment and on the data set, typically 70% of the attribute-value pairs can be excluded as being candidates for a source attribute-value pair (or a corresponding second rule) by applying pruning.

According to embodiments, the selection of the destination attribute-value pair is implemented by means of a GUI displayed to a user. The graphical user interface comprises one or more first GUI elements for selecting one column attribute from all available column attributes of the columnar data structures by the user. In addition, the GUI comprises one or more second GUI elements for selecting one value from the columnar data structure having assigned said selected column attribute, wherein the selected column attribute and the selected value constitute the destination attribute-value pair.

According to embodiments, the first and second GUI elements are automatically determined by analyzing the structure and data content of the columnar data structures. For example, a set of first data records respectively comprising a data value for the attributes 'temperature', 'moisture', 'failure rate' and 'operator' may be stored in a set of columnar data structures, whereby each of said attributes of the data records corresponds to one column attribute of a columnar data structure. By automatically evaluating all columnar attributes of the columnar data structures, for each particular columnar attribute a GUI element with a corresponding label may be displayed to the user via the GUI. As a result, the user is enabled to choose any of the column attributes as destination attribute. By displaying e.g. a drop-down list comprising the unique set of data values of the chosen columnar data structure, a user is provided with means to select one particular value or value range, thereby specifying the destination attribute-value pair. Automatically determining the first and second GUI elements by analyzing the structure and data content of the columnar data structures is advantageous as said features provide for a generic GUI which is operable to adapt its content dynamically to the structure of the underlying columnar data structures for which an interactive data analysis shall be carried out.

Depending on the embodiment, the column entries of the columnar data structures and the column entries of the mask data structures can be based on various types of data structures such as, for example, bit sets, bit vectors, sorted lists or sorted arrays. This is advantageous, because by representing column-value pairs as e.g. bit arrays, each data record is represented by one single bit and all set operations can be mapped to logical operations on the bit level.

A column entry is a row in a columnar data structure representing a particular data value and comprising the IDs of all first data records comprising or pointing to the respective data value and the column attribute of the columnar data structure as attribute-value pair. Bit vectors use bits to represent individual data records referenced in a particular column entry. Set operations can be performed on bit vectors e.g. by means of an overlay of bit vectors. Bit vectors represent each possible element of a set (here each ID of a first data record of a particular column entry) by a single bit. As a consequence, set operations like union or difference are simple bit operations that can be compiled into machine code and run very efficiently. Counting the number of bits that are "1" can also be accomplished in a very fast way by using bit patterns.

As an alternative to bit vectors, other data structures which allow for fast set operations, such as sorted lists can also be used. Each ID of a first data record is represented therein as a sorted ID-list. The union or difference between two data records can be accomplished by going through both lists sequentially and counting the number of matching record ID entries.

According to some embodiments, the mask data structures are provided by: providing an OLAP cube for executing a data analysis of all first data records, each dimension and/or hierarchical level of the OLAP cube having assigned one or more third attribute-value pairs; in dependence on a slicing, dicing, pivoting, drill-down or roll-up event performed on said OLAP cube, selecting a current dimension and/or a current hierarchical level of the OLAP cube; and automatically generating the mask data structures, wherein the mask data structures comprise the third attribute-value pairs of the current dimension and/or of the current hierarchical level as the second attribute-value pairs.

Executing an OLAP-cube based drill-down analysis in combination with the automated determination of first rules by evaluating a sub-set of data records selected by means of said OLAP-cube is advantageous, because it allows the execution of an interactive data mining method making advantage both of hypothesis-driven as well as non-hypothesis-driven approaches. It allows massive parallelization of computationally demanding processing, such as the calculation of co-occurrence scores for the rules. The runtime behavior of embodiments of the method linearly and very slowly increases with the number of analyzed data records.

According to embodiments, the graphical user interface comprises one or more third GUI elements for triggering the slicing, dicing, pivoting, drill-down or roll-up event on the OLAP cube, and/or comprises one or more fourth GUI elements for selecting and/or specifying the one or more third attribute-value pairs.

According to embodiments, the first rules are presented to the user on the graphical user interface in descending order depending on their co-occurrence-score.

According to embodiments, the first rules are presented to the user on the graphical user interface in descending order depending on their co-occurrence-score. Upon selection of one or more of said presented first rules, the source attribute-value pairs of the selected first rules are assigned as the third attribute-value pairs to the OLAP cube. This is advantageous, as the source attribute considered as relevant (e.g. because the corresponding second rule has assigned a high confidence score) provides for an automatically generated hypothesis which can be used to execute an OLAP-cube based, interactive and hypothesis-driven data analysis. As a consequence, the non-hypothesis driven approach for automatically determining the first rules can be used to create hypothesis for a succeeding, hypothesis-driven data analysis.

According to embodiments, the provided mask data structures further comprise k sub-set-bagging mask data structures, k being an integer larger than 1, wherein the selection of the second data records is performed by intersecting each of the k sub-set-bagging mask data structures with the columnar data structures and with any of the mask data structures not being a sub-set-bagging mask data structure, thereby returning k sub-sets of second data records, wherein the creation of the second rules comprises the creation of k sub-sets of second rules. The creation of each sub-set of second rules is implemented by creating second rules for the first attribute-value pairs of all second data records being contained in said sub-set of second data records, wherein specifically selecting one or more of the second rules as first rules further comprises: for each of the k sub-sets of second rules, specifically selecting one or more of its second rules as first rules in dependence on the calculated co-occurrence-count, thereby creating k sub-sets of first rules, and compiling, from all k sub-sets of first rules, a unique list of first rules, the unique list of first rules solely comprising first rules which are contained in at least t of said sub-sets of first rules, wherein $0<=t<=k$. Said first rules of the compiled list are returned as result.

Generating k sub-sets of second data records for providing first and second rules as described above, which is also referred to as 'sampling', is advantageous as it increases the robustness of the approach. Determining the rules by executing merely a single analysis on all available data records at once bears the danger of 'overfitting' the rules to said data set. Sampling allows to specifically select attribute-value pairs being indicative of the destination attribute-value pair by analyzing a plurality of data record sub-sets and to finally specifically select those attribute-value pairs which were determined as positive results multiple times based on different data sub-sets. A rule is considered as positive result if its source attribute-value pair is a significant indicator of the destination attribute-value pair, whereby the significance depends on the statistical approach used or on other criteria such as the co-occurrence count of a rule or of any value having been derived therefrom. Attribute-value pairs having been determined by applying sampling are considered as more 'robust' and as more reliable predictors for the destination attribute-value pair. Depending on the embodiment, the data record sub-sets used for sampling can be overlapping or non-overlapping.

According to some of the above embodiments, the k different sub-sets of second data records and corresponding sub-sets of second rules are overlapping. The co-occurrence count is calculated for the second rules belonging to/shared by multiple sub-sets only once. This is advantageous, as it helps to reduce processing time for calculating co-occurrence counts for the second rules. As the process of selecting sub-sets of second rules and determining the co-occurrence count are combined into one single procedure which exploits the inherent structural features of the columnar data structures and the mask data structures, some embodiments provide for a particularly efficient, non-hypothesis driven data mining approach.

State-of-the art bagging implementations are based on individual scans on relational databases for each of the k sub-sets of second data records. To the contrary, some embodiments allow for a highly efficient, parallelizable bagging technique which can be controlled by a user via a GUI in an interactive manner.

According to some embodiments, the determination of first and second rules based on k different second data record sub-sets is executed in parallel, e.g. on a multi-core data processing system. Different sub-sets are thereby evaluated by different processing units or by different data processing systems. This is advantageous, as it reduces the time for automatically determining the first rules.

According to embodiments, the selection of k sub-sets of second data records is executed concurrently. The calculation of the co-occurrence-counts of the second rules is thereby executed for each of the k sub-sets of second rules in parallel.

According to embodiments, the columnar data structures and the mask data structures are completely loaded into a working memory.

According to some embodiments, a relational database is used to store the first data records and a plug-in of said relational database reads the data records from the relational database, organizes the read data in the form of columnar data structures and loads the columnar data structures comprising the read data into memory. All data-mining is performed on the in-memory columnar data structures. The data in the columnar data structures in the main memory is periodically refreshed from the persistent relational database system. The plug-in, according to some embodiments, provides for a combination of non-hypothesis driven, automatic determination of first rules and a hypothesis-driven data analysis approach by means of an OLAP cube. Said plug-in may provide for an OLAP-cube based data warehouse and for a GUI for controlling the automated determination of the first rules in an interactive manner.

Depending on the embodiment, the relational database comprises first persistent data records and the plug-in provides for a GUI for interacting with the data-analysis features provided by the database plug-in. The plug-in and the relational database can be rung on the same or on a plurality of different computing systems connected to each other via a network, e.g. an Ethernet based network. The term plug-in as used herein encompasses any kind of software, firmware, hardware or combination thereof which is operable to access a database comprising a plurality of first data records, e.g. a relational database, and to execute the method according to any of the above embodiments. The plug-in may, for example, be implemented as a software module which can be hooked on an already installed relational DBMS and which is not operable without said relational database. According to other embodiments, the plug-in may be an independently maintained and installed software program being interoperable with said relational database.

In a further aspect, all tasks for determining a co-occurrence count are executed independently of each other and can be performed in parallel. In a further aspect, a computer-readable non-transitory storage medium for executing any of the above methods is provided. In a further aspect, a data processing system being operatively coupled to a columnar database is provided, the data processing system comprising a processor and a non-transitory storage medium comprising instructions which, when executed by the processor, execute any of the above methods.

As will be appreciated by one skilled in the art, various embodiments may be embodied as a system, method or computer program product. Accordingly, if not explicitly stated otherwise, some embodiments may take the form of an entirely hardware embodiment, an entirely software embodiment (including firmware, resident software, micro-code, etc.) or an embodiment combining software and hardware aspects that may all generally be referred to herein as a 'module' or 'system'. Any combination of one or more computer readable medium(s) may be utilized.

While the foregoing has been with reference to particular embodiments, it will be appreciated by those skilled in the art that changes in these embodiments may be made without departing from the principles and spirit of the invention, the scope of which is defined by the appended claims.

What is claimed is:

1. A computer-implemented method for determining first rules, wherein each first rule comprises a source attribute-value pair and a destination attribute-value pair, the method comprising:
   providing a columnar database, the columnar database comprising a plurality of columnar data structures, each columnar data structure being associated with one column attribute and comprising one or more column entries;
   providing first data records, the first data records being stored in the columnar database, each first data record having a plurality of first attribute-value pairs, wherein each value of said first attribute-value pairs is stored in one of the columnar data structures associated with the respective column attribute, wherein each column entry is associated with one value of the respective column attribute and comprises counting information, the counting information being indicative of a number of first data records having the respective first attribute-value pair;
   providing mask data structures, each mask data structure having the same structure as one of the columnar data structures, the mask data structures comprising one or more second attribute-value pairs;
   selecting second data records as a sub-set of the first data records by intersecting the columnar data structures and the mask data structures, the second data records selectively comprising first data records which comprise at least one first attribute-value pair matching one of the one or more second attribute-value pairs;
   selecting one of the column attributes and one value being contained in the column data structure associated with said selected column attribute as the destination attribute-value pair;
   creating one second rule for each first attribute-value pair of the second data records, wherein said first attribute-value pair is used as source attribute-value of said second rule and wherein the selected destination attribute-value pair is used as the destination attribute-value pair of said second rule;
   calculating, for each second rule, a co-occurrence-count between its respective source attribute-value pair and its destination attribute-value pair; and
   specifically selecting one or more of said second rules as the first rules in dependence on the calculated co-occurrence-count.

2. The computer-implemented method of claim 1, wherein specifically selecting one or more of said second rules comprises:
   sorting the second rules according to their co-occurrence-count in descending order and selecting the first n sorted second rules as n first rules, wherein n is an integer greater than 0;
   determining n second rules having a co-occurrence-count that exceeds a first threshold and selecting said n second rules as first rules, wherein n is an integer greater than 0; and
   calculating for each second rule a co-occurrence statistic providing for each of said second rules a significance score and selecting n of said second rules having a significance score that exceeds a second threshold, wherein n is an integer greater than 0.

3. The computer-implemented method of claim 2, wherein the co-occurrence statistic is based on a chi-square test.

4. The computer-implemented method of claim 1, wherein selecting the destination attribute-value pair is implemented by displaying a graphical user interface (GUI) to a user, the GUI comprising one or more first GUI elements for selecting one column attribute from the column attributes by the user, the GUI comprising one or more second GUI elements for selecting one value from the columnar data structure having assigned said selected column attribute, wherein the selected column attribute and the selected value constitute the destination attribute-value pair.

5. The computer-implemented method of claim 4, wherein the first and second GUI elements are automatically determined by analyzing the structure and data content of the columnar data structures.

6. The computer-implemented method of claim 1, wherein the column entries of the columnar data structures and column entries of the mask data structures are selected from a group consisting of: bit sets, bit vectors, sorted lists, and sorted arrays.

7. The computer-implemented method of claim 1, wherein the mask data structures are provided by:
  providing an online analytical process (OLAP) cube for executing a data analysis of all first data records, each dimension and/or hierarchical level of the OLAP cube having assigned one or more third attribute-value pairs;
  in dependence on a slicing, dicing, pivoting, drill-down or roll-up event performed on said OLAP cube, selecting a current dimension and/or a current hierarchical level of the OLAP cube; and
  automatically generating the mask data structures, wherein the mask data structures comprise the third attribute-value pairs of the current dimension and/or of the current hierarchical level as the second attribute-value pairs.

8. The computer-implemented method of claim 7, wherein the GUI comprises at least one or more GUI elements being selected from the group comprising:
  third GUI elements for triggering the slicing, dicing, pivoting, drill-down or roll-up event on the OLAP cube; and
  fourth GUI elements for selecting and/or specifying the one or more third attribute-value pairs.

9. The computer-implemented method of anyone of claim 7, wherein the first rules are presented to a user on the GUI in descending order depending on their co-occurrence-score and wherein upon selection of one or more of said presented first rules the source attribute-value pairs of the selected first rules are assigned as the third attribute-value pairs to the OLAP cube.

10. The computer-implemented method of claim 1, wherein the first rules are presented to a user on the graphical user interface in descending order depending on their co-occurrence-score.

11. The computer-implemented method of claim 1, wherein the provided mask data structures further comprise k sub-set-bagging mask data structures, k being an integer larger than 1;
  wherein the selection of the second data records is performed by intersecting each of the k sub-set-bagging mask data structures with the columnar data structures and with any of the mask data structures not being a sub-set-bagging mask data structure, thereby returning k sub-sets of second data records;
  wherein the creation of the second rules comprises the creation of k sub-sets of second rules, wherein the creation of each sub-set of second rules is implemented by creating second rules for the first attribute-value pairs of all second data records being contained in said sub-set of second data records;
  wherein specifically selecting one or more of the second rules as first rules further comprises, for each of the k sub-sets of second rules, specifically selecting one or more of its second rules as first rules in dependence on the calculated co-occurrence-count, thereby creating k sub-sets of first rules, and compiling, from all k sub-sets of first rules, a unique list of first rules, the unique list of first rules solely comprising first rules which are contained in at least t of said sub-sets of first rules, wherein $0<=t<=k$.

12. The computer-implemented method of claim 11, wherein the selection of k sub-sets of second data records is executed concurrently and wherein the calculation of the co-occurrence-counts of the second rules is executed for each of the k sub-sets of second rules in parallel.

13. The computer-implemented method of claim 1, wherein the columnar data structures and the mask data structures are completely loaded into a working memory.

14. A computer program product for determining first rules, wherein each first rule comprises a source attribute-value pair and a destination attribute-value pair, the computer program product comprising:
  a computer readable storage medium having computer readable program code embodied therewith, the computer readable program code being configured for:
    providing a columnar database, the columnar database comprising a plurality of columnar data structures, each columnar data structure being associated with one column attribute and comprising one or more column entries;
    providing first data records, the first data records being stored in the columnar database, each first data record having a plurality of first attribute-value pairs, wherein each value of said first attribute-value pairs is stored in one of the columnar data structures associated with the respective column attribute, wherein each column entry is associated with one value of the respective column attribute and comprises counting information, the counting information being indicative of a number of first data records having the respective first attribute-value pair;
    providing mask data structures, each mask data structure having the same structure as one of the columnar data structures, the mask data structures comprising one or more second attribute-value pairs;
    selecting second data records as a sub-set of the first data records by intersecting the columnar data structures and the mask data structures, the second data records selectively comprising first data records which comprise at least one first attribute-value pair matching one of the one or more second attribute-value pairs;
    selecting one of the column attributes and one value being contained in the column data structure associated with said selected column attribute as the destination attribute-value pair;
    creating one second rule for each first attribute-value pair of the second data records, wherein said first attribute-value pair is used as source attribute-value of said second rule and wherein the selected destination attribute-value pair is used as the destination attribute-value pair of said second rule;
    calculating; for each second rule, a co-occurrence-count between its respective source attribute-value pair and its destination attribute-value pair; and
    specifically selecting one or more of said second rules as the first rules in dependence on the calculated co-occurrence-count.

15. The computer program product according to claim 14, wherein specifically selecting one or more of said second rules comprises:

sorting the second rules according to their co-occurrence-count in descending order and selecting the first n sorted second rules as n first rules, wherein n is an integer greater than 0;

determining n second rules having a co-occurrence-count that exceeds a first threshold and selecting said n second rules as first rules, wherein n is an integer greater than 0; and calculating for each second rule a co-occurrence statistic providing for each of said second rules a significance score and selecting n of said second rules having a significance score that exceeds a second threshold, wherein n is an integer greater than 0.

16. The computer program product according to claim 15, wherein the co-occurrence statistic is based on a chi-square test.

17. The computer program product according to claim 14, wherein selecting the destination attribute-value pair is implemented by displaying a graphical user interface to a user, the graphical user interface comprising one or more first GUI elements for selecting one column attribute from the column attributes by the user, the graphical user interface comprising one or more second GUI elements for selecting one value from the columnar data structure having assigned said selected column attribute, wherein the selected column attribute and the selected value constitute the destination attribute-value pair.

18. The computer program product according to claim 17, wherein the first and second GUI elements are automatically determined by analyzing the structure and data content of the columnar data structures.

19. The computer program product according to claim 14, wherein the column entries of the columnar data structures and column entries of the mask data structures are selected from a group consisting of: bit sets, bit vectors, sorted lists, and sorted arrays.

20. A data processing system being operatively coupled to a columnar database, the data processing system comprising a processor, the system configured to perform a method comprising:

providing a columnar database, the columnar database comprising a plurality of columnar data structures, each columnar data structure being associated with one column attribute and comprising one or more column entries;

providing first data records, the first data records being stored in the columnar database, each first data record having a plurality of first attribute-value pairs, wherein each value of said first attribute-value pairs is stored in one of the columnar data structures associated with the respective column attribute, wherein each column entry is associated with one value of the respective column attribute and comprises counting information, the counting information being indicative of a number of first data records having the respective first attribute-value pair;

providing mask data structures, each mask data structure having the same structure as one of the columnar data structures, the mask data structures comprising one or more second attribute-value pairs;

selecting second data records as a sub-set of the first data records by intersecting the columnar data structures and the mask data structures, the second data records selectively comprising first data records which comprise at least one first attribute-value pair matching one of the one or more second attribute-value pairs;

selecting one of the column attributes and one value being contained in the column data structure associated with said selected column attribute as the destination attribute-value pair;

creating one second rule for each first attribute-value pair of the second data records, wherein said first attribute-value pair is used as source attribute-value of said second rule and wherein the selected destination attribute-value pair is used as the destination attribute-value pair of said second rule;

calculating, for each second rule, a co-occurrence-count between its respective source attribute-value pair and its destination attribute-value pair; and specifically selecting one or more of said second rules as the first rules in dependence on the calculated co-occurrence-count.

* * * * *